United States Patent [19]
Ernst et al.

[11] Patent Number: 5,945,232
[45] Date of Patent: Aug. 31, 1999

[54] PEM-TYPE FUEL CELL ASSEMBLY HAVING MULTIPLE PARALLEL FUEL CELL SUB-STACKS EMPLOYING SHARED FLUID PLATE ASSEMBLIES AND SHARED MEMBRANE ELECTRODE ASSEMBLIES

[75] Inventors: William D. Ernst, Troy; Gary Mittleman, Albany, both of N.Y.

[73] Assignee: Plug Power, L.L.C., Latham, N.Y.

[21] Appl. No.: 09/054,425

[22] Filed: Apr. 3, 1998

[51] Int. Cl.⁶ .............................. H01M 8/10; H01M 8/24
[52] U.S. Cl. ................................................ 429/32; 429/39
[58] Field of Search .................. 429/30, 32, 38, 429/39

[56] References Cited

U.S. PATENT DOCUMENTS

| | | |
|---|---|---|
| 3,553,026 | 1/1971 | Winsel . |
| 3,977,903 | 8/1976 | Jacquelin . |
| 4,310,605 | 1/1982 | Early et al. ................................ 429/18 |
| 4,443,522 | 4/1984 | Struthers .................................... 429/18 |
| 4,699,853 | 10/1987 | Okada et al. .......................... 429/39 X |
| 5,069,985 | 12/1991 | Cohen et al. .......................... 429/38 X |
| 5,171,646 | 12/1992 | Rohr .......................................... 429/34 |
| 5,238,754 | 8/1993 | Yasuo et al. ............................... 429/30 |
| 5,480,738 | 1/1996 | Elangovan et al. ........................ 429/32 |
| 5,532,072 | 7/1996 | Spaeh et al. ............................... 429/34 |
| 5,607,786 | 3/1997 | Guthrie et al. ......................... 429/38 X |
| 5,683,828 | 11/1997 | Spear et al. ................................ 429/13 |
| 5,686,199 | 11/1997 | Cavalca et al. ........................ 429/39 X |
| 5,824,428 | 10/1998 | Nishida et al. ......................... 429/30 X |

*Primary Examiner*—Stephen Kalafut
*Attorney, Agent, or Firm*—Heslin & Rothenberg, P.C.

[57] ABSTRACT

A Proton Exchange Membrane (PEM) fuel cell stack is disclosed having multiple layers between a first end plate and a second end plate. The multiple layers define multiple fuel cell sub-stacks disposed in parallel and electrically isolated from each other intermediate the end plates. At the end plates, the fuel cell sub-stacks are electrically connected in series. At least some layers of the fuel cell stack comprise shared layers shared between multiple sub-stacks, and at least some layers of the multiple layers comprise dedicated layers for corresponding fuel cell sub-stacks. The shared layers include a fluid flow plate assembly and a membrane electrode assembly, while the dedicated layers comprise gas diffusion layers. The fluid flow plate assembly is fabricated of a non-conductive material and has multiple conductive fluid flow sub-plates, each of which aligns to a respective sub-stack of the fuel cell stack.

47 Claims, 9 Drawing Sheets

PEM-TYPE FUEL CELL ASSEMBLY HAVING MULTIPLE PARALLEL FUEL CELL SUB-STACKS EMPLOYING SHARED FLUID PLATE ASSEMBLIES AND SHARED MEMBRANE ELECTRODE ASSEMBLIES

CROSS-REFERENCE TO RELATED APPLICATION

This application relates to co-filed, commonly assigned U.S. patent application Ser. No. 09/054,670, entitled "Easily-Formable Fuel Cell Assembly Fluid Flow Plate Having Conductivity And Increased Non-Conductive Material," Attorney Docket No. 1404.021, the entirety of which is hereby incorporated herein by reference.

TECHNICAL FIELD

This invention concerns in general fuel cells formed by aligning fluid flow plates and other components to form a fuel cell stack assembly. In particular, this invention provides an improved fuel cell stack assembly having multiple integrated fuel cell sub-stacks. While the invention can be applied to various apparatuses involving, e.g., stacked fluid flow plates, it is particularly pertinent to fuel cells using Proton Exchange Membrane technology.

BACKGROUND OF THE INVENTION

A proton exchange membrane (PEM) fuel cell converts the chemical energy of fuels and oxidants directly into electrical energy. PEM fuel cells offer many advantages over conventional means of generating electrical energy. For example: they operate at relatively low temperatures and therefore require little or no warmup time; they are clean (their exhaust is typically water and air); they are efficient; and the typical sources of fuel/oxidant (hydrogen, air/oxygen) are in abundant supply.

The centerpiece of a typical PEM-type fuel cell is a solid polymer electrolyte (the PEM) that permits the passage of protons (i.e., $H^+$ ions) from the anode side of the fuel cell to the cathode side of the fuel cell while preventing passage therethrough of reactant fluids (e.g., hydrogen and air/oxygen gases).

FIG. 1 depicts a conventional PEM-type fuel cell. A reaction on the anode side of the PEM produces protons ($H^+$) and electrons. The protons pass through the membrane to the cathode side, while the electrons travel to the cathode side of the membrane through an external electrical conductor. On the cathode side, the protons and electrons react with oxygen gas to produce water. The external electron flow from the anode to the cathode is the electrical energy created by the fuel cell reaction that can be used to supply electricity to a load.

More specifically, as depicted in FIG. 1, the PEM fuel cell 100 comprises an anode-side fluid flow plate 102 for the flow of hydrogen, an anode area 104, a proton exchange membrane 106, a cathode area 108, and a cathode-side fluid flow plate 110 for the flow of oxygen or air containing oxygen. Areas 104 and 108 conventionally include a gas diffusion means (not shown). Hydrogen gas introduced from a hydrogen manifold 112 at the anode-side fluid flow plate 102 travels along a fluid flow channel 124 in the anode-side flow plate 102, and also diffuses in a direction perpendicular to the flow channel towards the anode area 104. In the anode area 104, the hydrogen gas is oxidized to form hydrogen nuclei ($H^+$ ions or protons) and electrons. The $H^+$ ions travel through the proton exchange membrane 106 to the cathode area 108, but the hydrogen gas itself does not penetrate the proton exchange membrane 106.

The electrons formed by the above-mentioned reaction are conducted from the anode area 104 to the anode-side fluid flow plate 102, to conductive collector plate(s) 114. Electrons flow from the collector plate(s) 114 through an external electrical conductor 116 to a load 118, and from the load to the cathode side of the fuel cell. At the cathode side, oxygen gas, either in pure form or as a component of air, is introduced to a channel 120 on a cathode-side fluid flow plate 110 from an oxygen manifold 122. The oxygen reacts with the protons ($H^+$) coming through the membrane 106, and the electrons coming from the external conductor, to form water.

In the PEM cell, the two chemical reactions are:

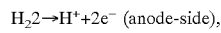

$$H_2 \to H^+ + 2e^- \text{ (anode-side)},$$

and

$$O_2 + 4H^+ + 4e^- \to 2H_2O \text{ (cathode-side)}.$$

Each fuel cell typically delivers a relatively small voltage, on the order of 0.4 to 0.9 volts. In order to achieve higher voltage, fuel cells are often disposed as multiple layers connected in series within a fuel cell stack (described further herein).

Increasingly, PEM fuel cell research activity is concentrating on ever smaller stacks (for example, 1–5 kW). However, there is a parallel need to maintain high stack voltage, to provide higher electrical power conditioning efficiency, while continuing to reduce stack costs (for example, by minimizing the number of plates and joints within the stack). To meet these conflicting needs, new fluid flow plate and fuel cell stack designs are required.

DISCLOSURE OF THE INVENTION

Briefly described, this invention comprises in one aspect a fluid flow plate assembly for a fuel cell. The fluid flow plate assembly includes a fluid flow plate having at least one flow channel, and a manifold hole whose perimeter constitutes a section of a manifold of the fuel cell. The fluid flow plate is divided into multiple fluid flow sub-plates, each fluid flow sub-plate is electrically insulated from all other fluid flow sub-plates of the plate assembly. The at least one flow channel intersects the manifold hole for communicating fluid either to or from at least one fluid flow sub-plate of the multiple fluid flow sub-plates of the fluid flow plate. As an enhanced embodiment, the fuel cell comprises a PEM-type fuel cell stack and each fluid flow sub-plate comprises a separate conductive member within the fluid flow plate.

In another aspect, the invention comprises a fuel cell assembly which includes multiple fuel cell sub-stacks disposed in parallel and having multiple layers. At least some layers of the multiple layers comprise shared layers between the fuel cell sub-stacks. One shared layer is a fluid flow plate assembly which includes a fluid flow plate having at least one flow channel, and a manifold hole whose perimeter constitutes a section of a manifold of the fuel cell. The fluid flow plate is divided into multiple fluid flow sub-plates, each fluid flow sub-plate being electrically insulated from all other fluid flow sub-plates of the plate assembly. The at least one flow channel intersects the manifold hole for communicating fluid either to or from at least one fluid flow sub-plate of the multiple sub-plates in the plate assembly.

In a further aspect, the invention comprises a membrane electrode assembly (MEA) for a PEM-type fuel cell stack.

The membrane electrode assembly includes a solid electrolyte layer having two main surfaces and multiple regions of catalyst applied to each main surface of the electrolyte layer. The PEM-type fuel cell stack comprises multiple fuel cell sub-stacks disposed in parallel, and the MEA is designed to be shared by the multiple parallel fuel cell sub-stacks. When shared, at least some catalyst regions on the main surfaces of the solid electrolyte layer align to different fuel cell sub-stacks of the multiple fuel cell sub-stacks comprising the PEM-type fuel cell stack.

In still another aspect, the invention encompasses a fuel cell assembly having multiple fuel cell sub-stacks disposed in parallel, with each fuel cell sub-stack comprising a PEM-type fuel cell. The multiple parallel fuel cell sub-stacks comprise multiple layers and at least some layers of the multiple layers are shared between fuel cell sub-stacks. One shared layer comprises a membrane electrode assembly (MEA) which includes a solid electrolyte layer having two main surfaces and multiple regions of catalyst applied to each main surface of the electrolyte layer. At least some catalyst regions on the main surfaces of the solid electrolyte layer align with and comprise part of different fuel cell sub-stacks of the multiple parallel fuel cell sub-stacks so that the MEA is shared between at least two fuel cell sub-stacks in the fuel cell assembly.

In yet another aspect, the invention comprises a PEM-type fuel cell stack which includes multiple layers disposed between a first end plate and a second end plate. The multiple layers define multiple parallel fuel cell sub-stacks. At least some layers of the multiple layers are shared by at least two sub-stacks of the multiple parallel sub-stacks. In addition, the shared layers each contain a manifold hole whose perimeter constitutes a section of a fluid manifold of the PEM-type fuel cell stack. The fluid manifold is disposed in the interior of the PEM-type fuel cell stack intermediate the multiple parallel fuel cell sub-stacks and the manifold hole is disposed between the at least two sub-stacks sharing the layer. As an enhancement, the shared layers can comprise shared fluid flow plate assemblies and/or shared membrane electrode assemblies as summarized above.

To restate, this invention presents various novel fluid flow plate and membrane electrode assemblies for a fuel cell stack having multiple fuel cell sub-stacks disposed in parallel. The structures described allow/comprise a smaller overall stack size without sacrificing stack voltage and reduce stack costs by minimizing the number of plates and other layers in the stack. A full size flow plate assembly in accordance with this invention is designed with a plurality of fluid flow sub-plates, each of which will comprise part of one sub-stack of the multiple sub-stacks comprising the fuel cell stack. The electrically conductive, fluid flow sub-plates are electrically insulated laterally from each other and the sub-stacks are electrically connected in series, parallel, or a combination thereof, within the main fuel cell stack to provide a higher output voltage. A four sub-stack embodiment is described in detail herein, but the concepts presented apply/comprise any fuel cell stack having two or more sub-stacks.

In accordance with this invention, manifolding and bolting can reside between the multiple sub-stacks in the middle of the fuel cell stack. By including bolts within the middle of the fuel cell assembly, clamping pressure is better distributed and end plate deflection is minimized. Using an adhesive between various plates within the fuel cell assembly can further reduce the requirements for bolting. In addition, in another aspect, a single membrane electrode assembly (MEA) is preferably shared by PEM-type fuel cells in different sub-stacks of a PEM-type fuel cell assembly, with different voltage potentials existing across the membrane regions aligned to different sub-stacks of the assembly. The MEA is fabricated in a configuration that optimizes material usage.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, this invention comprises a fuel cell assembly having various novel features, including provision of multiple "integrated" fuel cell sub-stacks in parallel within a PEM-type assembly so that the sub-stacks share certain fuel cell layers. For example, a shared fluid flow plate assembly is provided wherein the plate is divided into multiple fluid flow sub-plates, each of which is electrically conductive and insulated from the other sub-plates in the plate assembly. The sub-plates each align with and comprise part of a respective sub-stack of the fuel cell assembly.

Compaction of the fuel cell assembly is further achieved by providing fluid manifolds in the middle of the assembly between the sub-stacks, as well as by providing one or more bolts or other structural members in the middle of the assembly to better distribute a desired clamping force. Further features of this invention include the sharing of an electrolyte layer among multiple sub-stacks within the fuel cell assembly, with different regions of the electrolyte comprising parts of different sub-stacks. These different regions of the electrolyte may also have different applied voltage potentials. Non-conductive and conductive adhesives can be used within the fuel cell assembly as substitutes for gaskets and to reduce the clamping force conventionally applied between end plates of a fuel cell assembly.

The above-noted features of the present invention, as well as others, are described below with reference to a PEM-type fuel cell assembly embodiment having four parallel fluid flow sub-stacks. Those skilled in the art will recognize, however, that the novel features described herein can be applied to any fuel cell stack having two or more parallel disposed sub-stacks. Further, although the concepts presented are preferably employed within a PEM-type fuel cell assembly, many features are applicable to other types of electrochemical fuel cells.

Figure 1:
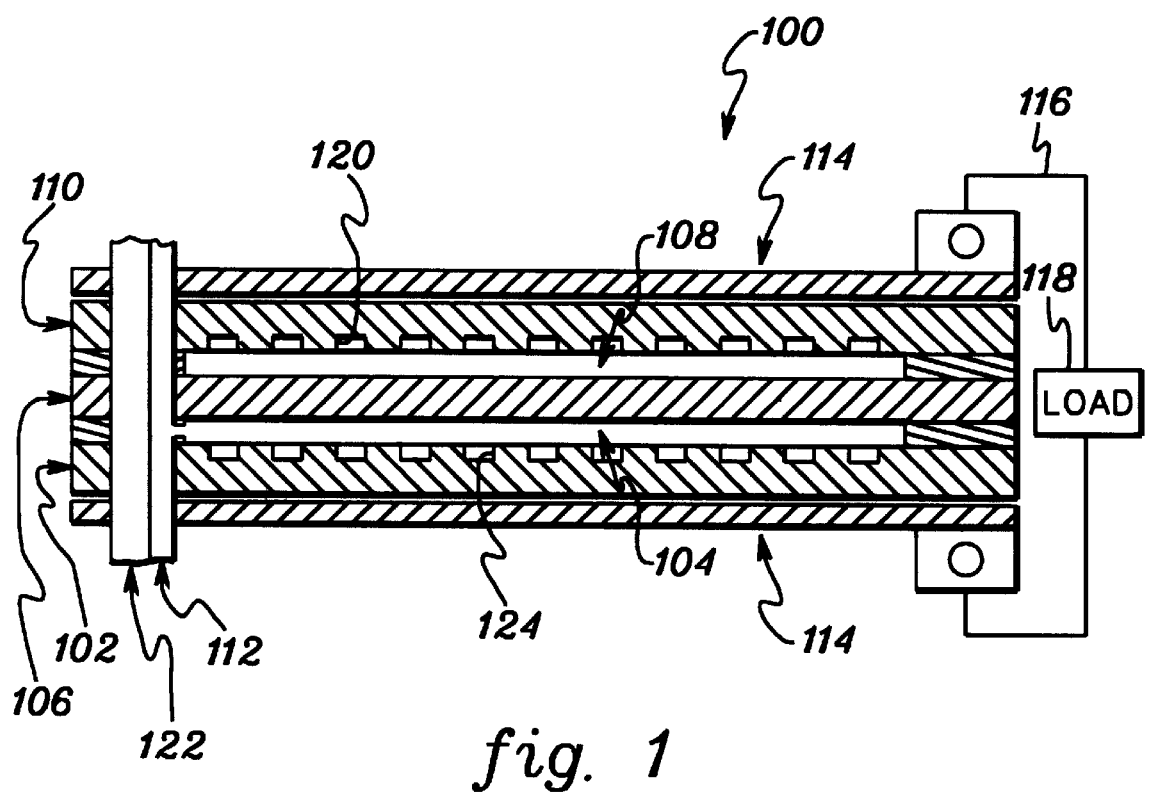
FIG. 1 is a sectional, elevational view of a PEM fuel cell, for which a fluid flow plate assembly in accordance with the present invention can be used.
Figure 2:
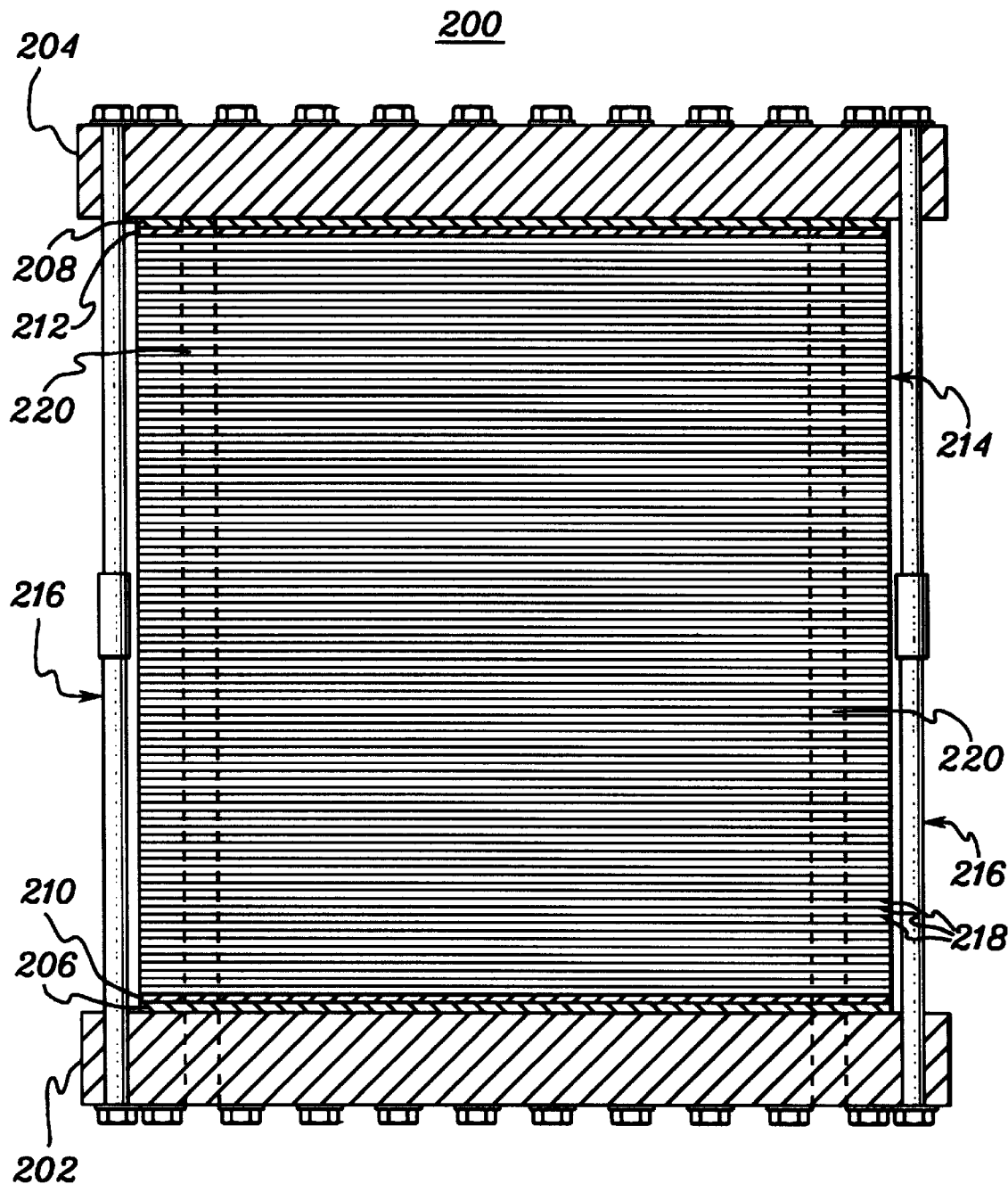
FIG. 2 is a sectional, elevational view of one embodiment of a fuel cell assembly to incorporate the fluid flow plate assembly, membrane electrode assembly and parallel sub-stack concepts of the present invention.
Figure 3:
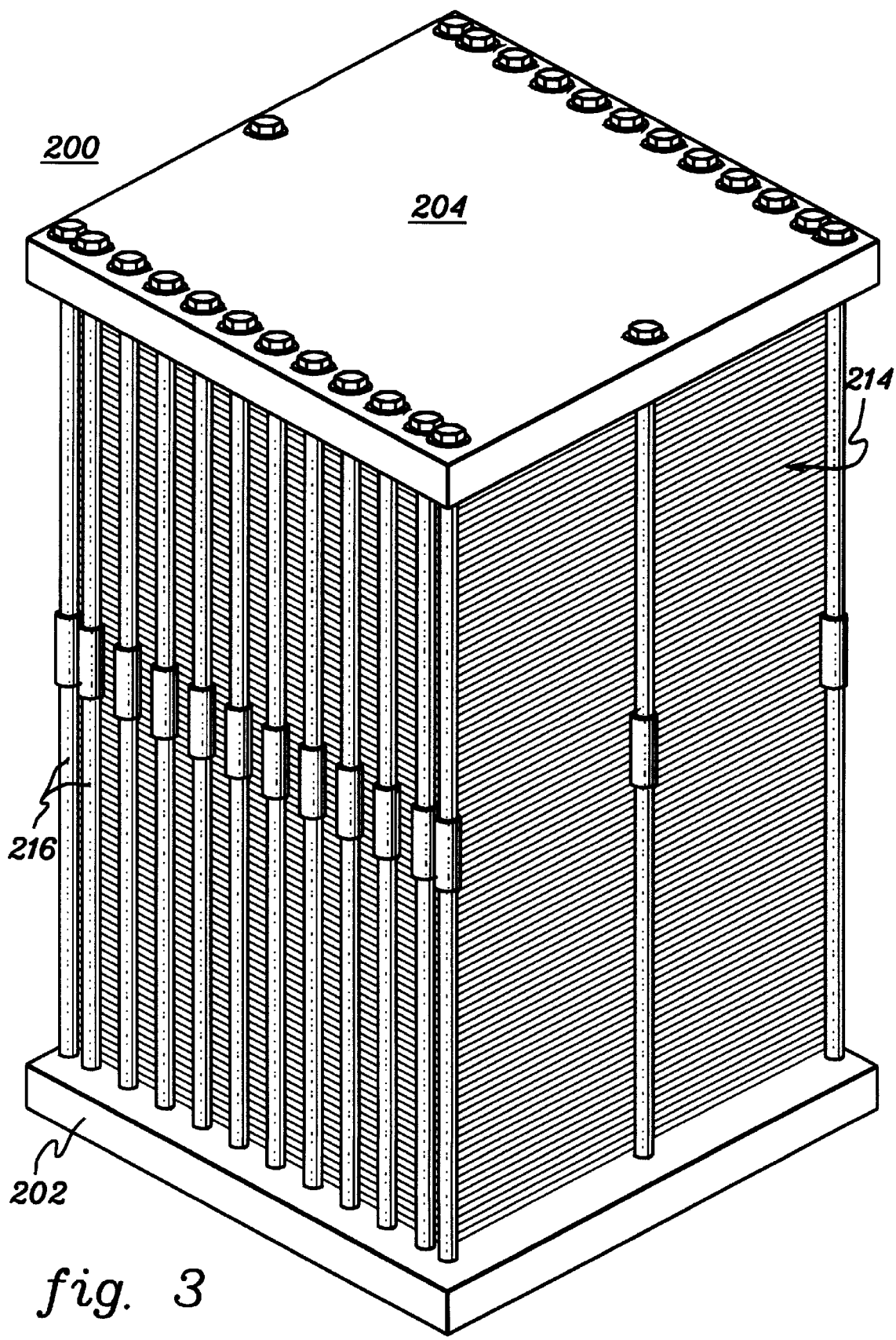
FIG. 3 is an isometric view of the fuel cell assembly embodiment of FIG. 2.

FIGS. 2 & 3 depict the basic structure of a fuel cell assembly to incorporate features in accordance with the principles of this invention. This fuel cell assembly (or stack), generally denoted 200, includes end plates 202 & 204, insulation layers 206 & 208, and current collector/conductor plates 210 & 212 at respective ends. A plurality of series connected fuel cells 214 are disposed in stacked relation between the end plates. Conventionally, this plurality of fuel cells 214 might comprise a plurality of series connected PEM-type fuel cells 100 such as depicted in FIG. 1.

The individual layers 218 of the series connected fuel cells comprising stack 200 include aligned openings which form fluid manifolds 220 for supplying fluids to, removing fluids from, and otherwise communicating and/or servicing fluids to the plurality of fuel cells of the stack. Structural members or bolts 216 are employed to impart a desired compressive force to the layers of fuel cells. As one example, the layers of fuel cells may have applied compressive forces equivalent to approximately 200 to 400 pounds per square inch.

One example of a fuel cell assembly pursuant to the present invention is depicted in FIGS. 4–9. In this embodiment, four sub-stacks of PEM-type fuel cells are disposed in parallel between two end plates.

Figure 4:
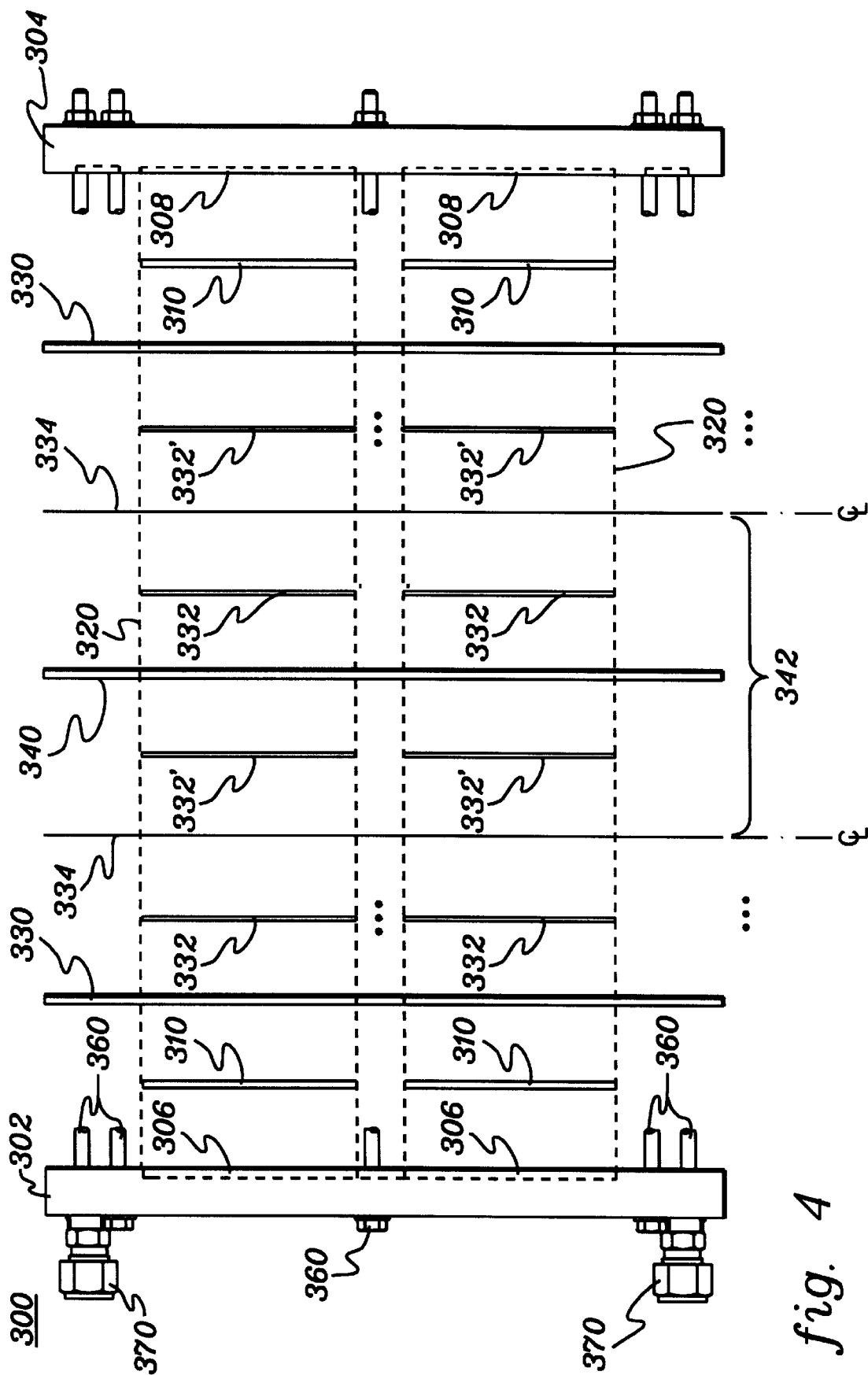
FIG. 4 is an exploded elevational view of one embodiment of a fuel cell assembly in accordance with the present invention having multiple parallel fuel cell sub-stacks with shared flow plates and shared MEA layers.

An exploded, elevational view of the fuel cell assembly (or stack), denoted 300, is shown in FIG. 4. Assembly 300 includes a plurality of active layers positioned between a first end plate 302 and a second end plate 304. End plates 302 & 304 include recesses 306 & 308, respectively, for receiving collector plates 310 disposed at each end of the four sub-stacks 320. Alternatively, end plates 302 & 304 could be constructed in accordance with the teachings of a co-pending, commonly assigned U.S. patent application entitled "Current Conducting End Plate of Fuel Cell Assembly," Ser. No. 08/884,452, the entirety of which is hereby incorporated herein by reference.

Adjacent to each collection plate 310 is (for example) a composite, monopolar fluid flow plate assembly 330 configured as a shared layer in accordance with the present invention. Alternatively, plate 330 could comprise a cooling plate or an integrated cooling and fluid flow plate. Individual anode or cathode gas diffusion layers 332, 332' within each sub-stack 320 of the fuel cell assembly 300 sandwich a shared membrane or solid electrolyte assembly (MEA) 334. A composite, bipolar fluid flow plate assembly 340 configured as a shared layer in accordance with the present invention completes stack 300. The center layers, between the center lines of the MEAs 334, comprise a repeating fuel cell unit 342 within stack 300. For example, the fuel cell assembly may comprise two fuel cell units 342 to over one hundred such fuel cell units 342 compressed together in series within the stack to define the multiple parallel sub-stacks in accordance with this invention.

Figure 5:
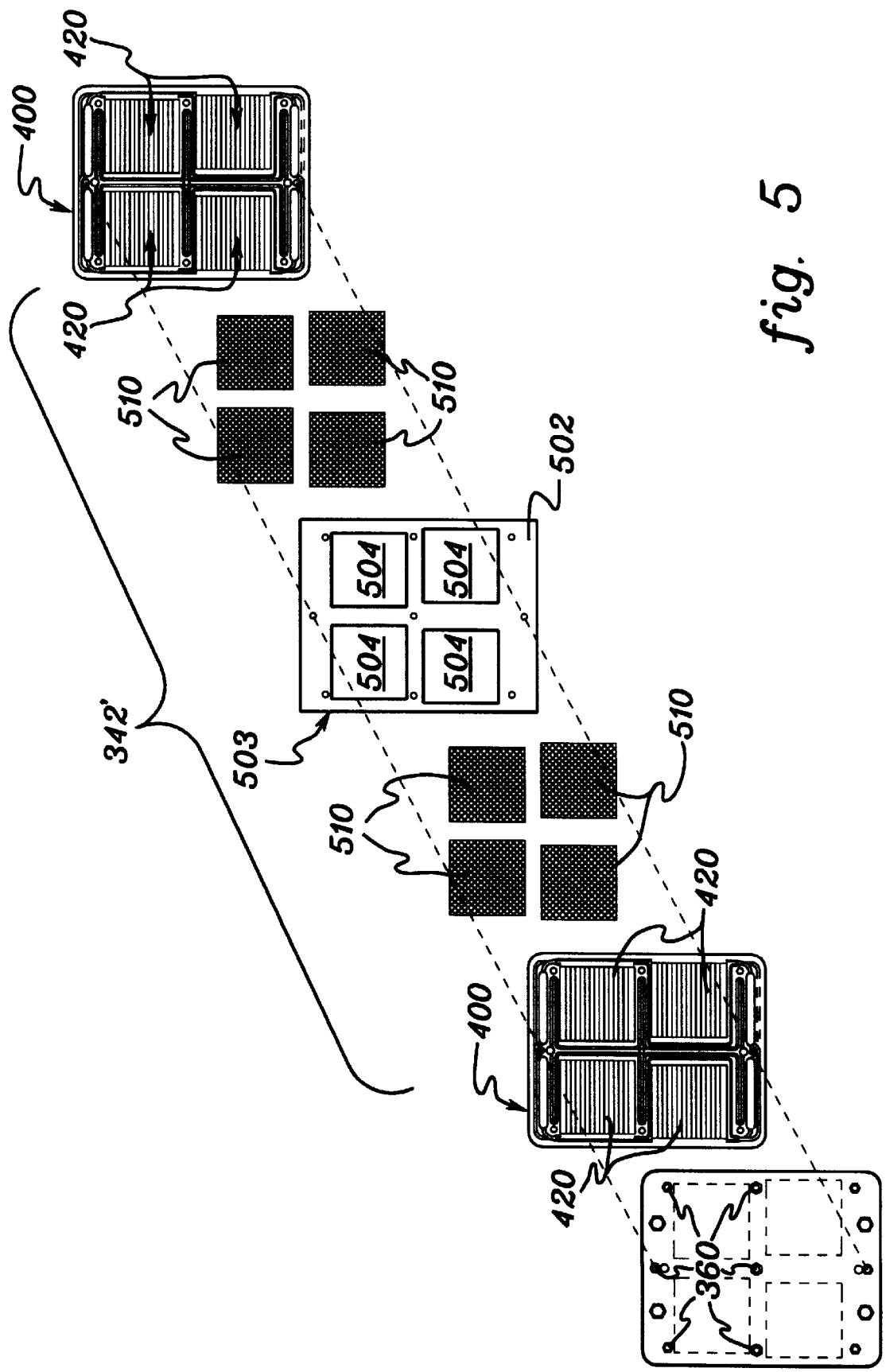
FIG. 5 is a partially exploded plan view of the fuel cell assembly embodiment of FIG. 4.

FIGS. 4 & 5 also depict structural members or bolts 360 at the periphery of the stack, as well as intermediate the sub-stacks to better distribute the compressive forces applied to the assembly via end plates 302 & 304. In this embodiment, fluid manifold couplings 370 are shown at the periphery of end plate 302. As noted above, however, one or more fluid manifolds could also be disposed within the fuel cell assembly intermediate the sub-stacks.

Figure 6:
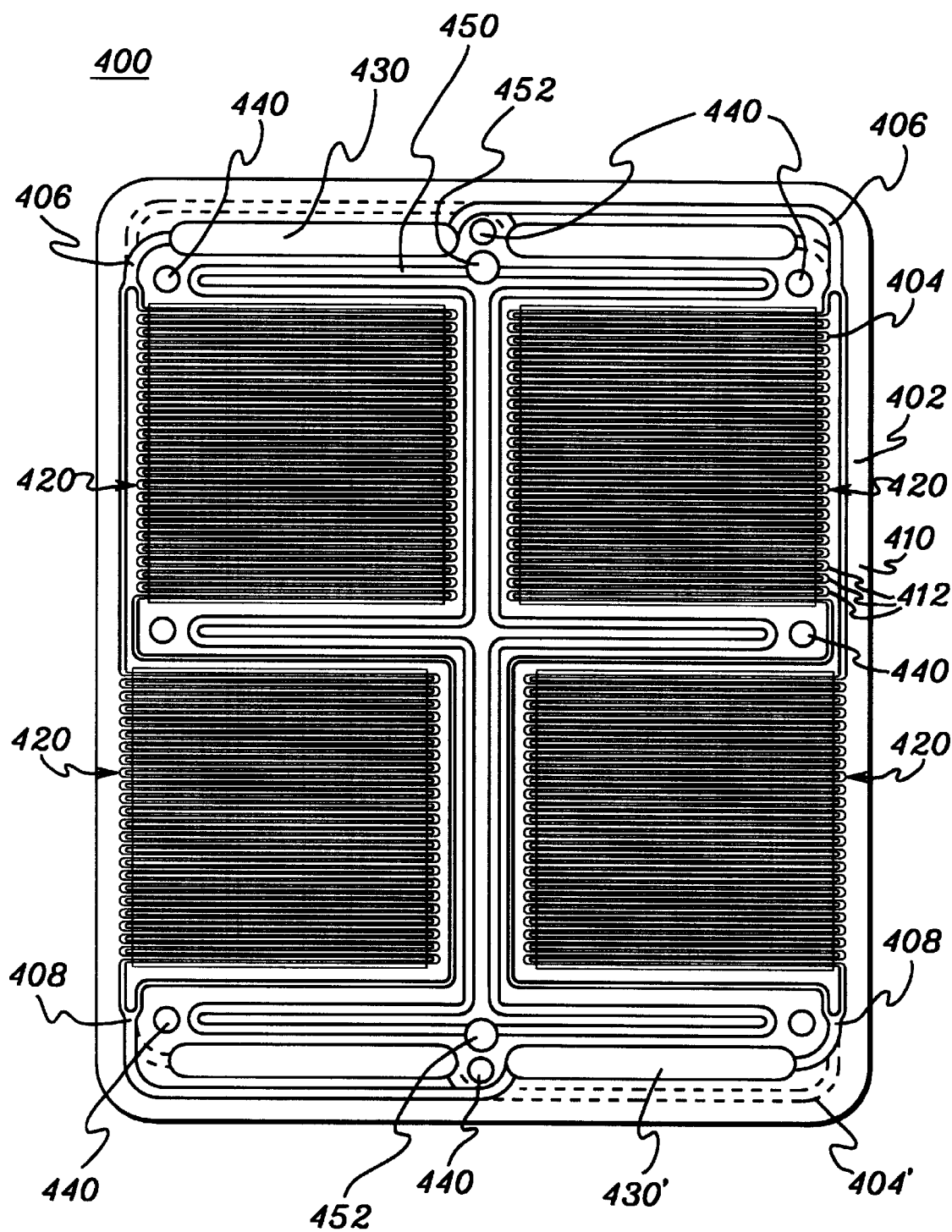
FIG. 6 is an enlarged plan view of the fluid flow plate assembly of FIGS. 4 & 5, showing multiple electrically conductive, fluid flow sub-plates 420 in accordance with one aspect of the present invention.

One embodiment of a fluid flow plate 400 in accordance with the present invention is shown in FIGS. 5 & 6. This fluid flow plate 400 may be a bipolar plate, monopolar plate, combined monopolar plate (e.g., anode cooler or cathode cooler), or cooling plate. As a specific example, plate 400 is assumed to comprise a bipolar fluid flow plate having a first main surface 402 with a main flow channel 404 thereon, and a second main surface (not shown) with a similar type main flow channel 404' (shown in phantom) thereon.

Fluid flow plate 400 comprises a non-conductive material or region 410 and electrically conductive members or flow fields 420, each of which will comprise one layer in a respective sub-stack (320) of the fuel cell assembly. Each conductive flow field 420 comprises a sub-plate that is electrically insulated from the other sub-plates of plate assembly 400. Channel 404 inlets/ports 406 and outlets/ports 408 are in fluid communication with manifolds 430 & 430', respectively, for providing/removing fluid to/from the fluid flow sub-plates 420 in parallel. As an alternative to the single reactant inlet manifold and single reactant outlet manifold depicted, a dedicated reactant inlet and outlet, or multiple reactant inlets and outlets, could be provided for one or more open-face fluid channel(s) on each sub-plate 420 of each main surface of plate assembly 400. A detailed description of the construction of fluid flow plate assembly 400 including various alternative embodiments is provided in the above-incorporated patent application entitled "Easily-Formable Fuel Cell Assembly Fluid Flow Plate Having Conductivity And Increased Non-Conductive Material."

Briefly summarized, non-conductive region 410 of plate assembly 400 can include a plurality of semi-circular or turning fluid channels 412 for communicating fluid between adjacent parallel channels 414 of the conductive sub-plates 420. Region 410 can also include multiple openings 440 disbursed throughout for accommodating structural members or bolts used in clamping the fuel cell assembly together. Further, region 410 may support one or more coolant flow channels 450 in fluid communication with appropriate coolant manifolds 452.

Conceptually, significant features of this invention include the isolation of the electrically conductive sub-plates and the integration of multiple sub-plates onto a single fluid flow plate assembly for inclusion in a PEM-type fuel cell assembly. Further, within such an assembly, the inclusion of bolts and/or manifolds in the interior portion of the plate, for example, through non-conductive region 410, can provide practical commercial advantages. By appropriately spacing the sub-plates 420, cooling can also be integrated into the plate, i.e., assuming that the sub-plates themselves communicate reactant/product to the different sub-stacks of the fuel cell assembly. Alternatively, flow channels 406 & 408 could themselves communicate coolant, humidification, or other product to the sub-stacks within the assembly. As noted, plate assembly 400 might comprise a bipolar plate, monopolar plate, combined monopolar plate, or cooling plate. Further, the number and configuration of the conductive sub-plates 420 can vary (see e.g. FIG. 11) to coincide with the number and location of parallel sub-stacks employed within the fuel cell assembly constructed in accordance with the present invention.

Returning to FIG. 5, a fuel cell unit 342' in accordance with this invention comprises multiple fuel cell units disposed in parallel and electrically isolated from each other laterally. These multiple fuel cell units are stacked within the fuel cell assembly and define laterally the multiple parallel sub-stacks of fuel cells. These parallel sub-stacks of fuel cells share certain layers of the fuel cell units in accordance with this invention. Further, the multiple parallel sub-stacks are electrically series connected through, e.g., bus bars in the end plates of the fuel cell assembly.

Each fuel cell unit 342' includes a membrane or solid electrolyte assembly 502 having anode and cathode catalysts 504 in alternating regions aligned to different ones of the parallel implemented sub-stacks. Preferably, solid electrolyte 502 is a solid polymer electrolyte made using a polymer such as that manufactured by E.I. DuPont de Nemours Company, and sold under the trademark NAFION®. Further, an active electrolyte such as a sulfonic acid group might be employed within the polymer. In another example, the solid polymer electrolyte might be formed of a material manufactured by W.L. Gore & Associates (Elkton, Md.) and sold under the trademark GORE-SELECT®. Catalysts 504 (for example, platinum) facilitate chemical reactions at the anode and cathode sides of the solid polymer electrolyte. The electrolyte and catalyst regions can be referred to as a "membrane electrode assembly" (MEA) 503.

MEA 503 is sandwiched between individual anode and cathode gas diffusion layers (GDLs) 510 of the separate sub-stacks, with the anode and cathode of a given fuel cell sub-stack being on opposite sides of MEA 503. GDLs 510 can be formed with a resilient and conductive material such as carbon fabric or carbon fiber paper. In one embodiment of a gas diffusion layer, porous carbon cloth or paper is infused with a slurry of carbon black and sintered with TEFLON® material. The anode and cathode GDLs serve as electrochemical conductors between catalyzed sites 504 on the solid polymer electrolyte 502, with the fuel (e.g., hydrogen) and oxidant (e.g., air/oxygen) flowing in anode and cathode flow channels in sub-plates 420 at each end of the fuel cell unit 342' of FIG. 5. Further, the GDLs also present to the surfaces of the MEA a combination of microscopic porosity and macroscopic porosity. Microscopic porosity allows reactant gas molecules to pass generally longitudinally from the sub-plate 420 flow channels to the surface of the MEA. Macroscopic porosity allows product water formed at the cathode surface of the MEA to be removed by flowing generally longitudinally into the cathode flow channels, to prevent flooding of the catalyst particles.

Figure 7:
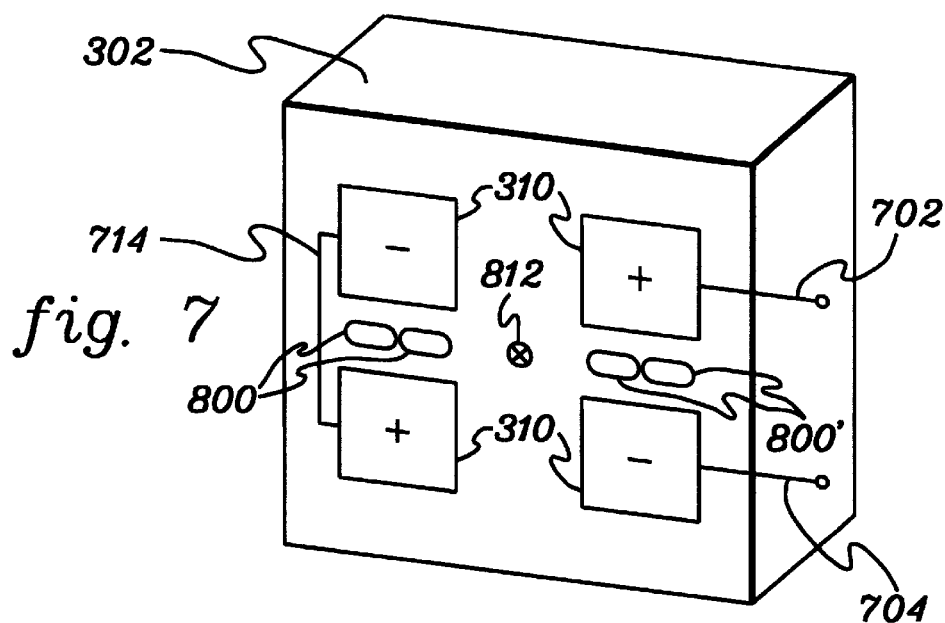
FIG. 7 is a representation of end plate 302 of FIG. 4, showing the current collector plates 310 at one end of each sub-stack of the fuel cell assembly, as well as series electrical connection of two of the sub-stacks.
Figure 8:
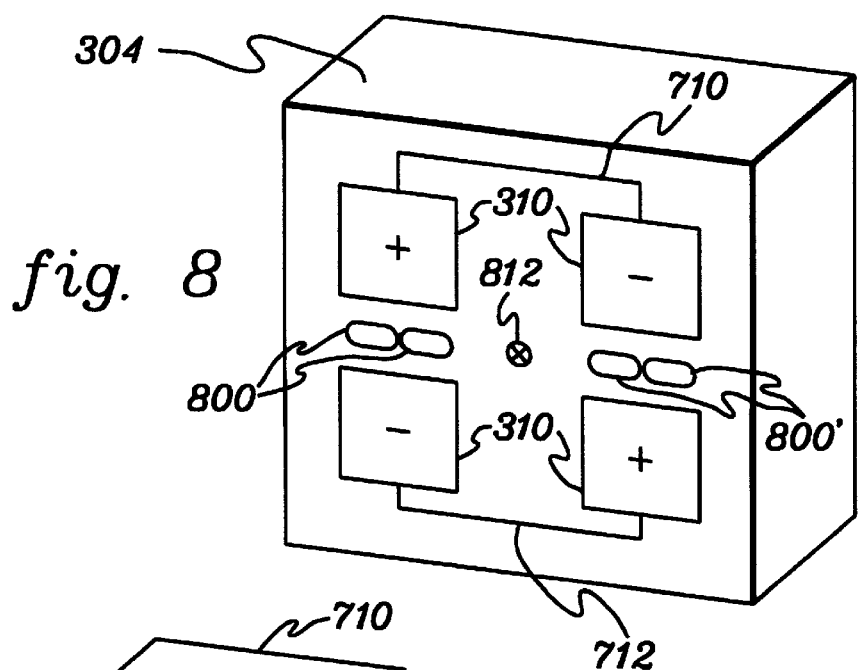
FIG. 8 is a representation of end plate 304 of FIG. 4, showing the collector plates at the opposite end of each sub-stack of the fuel cell assembly, as well as series electrical connection of two different pairs of sub-stacks.
Figure 9:
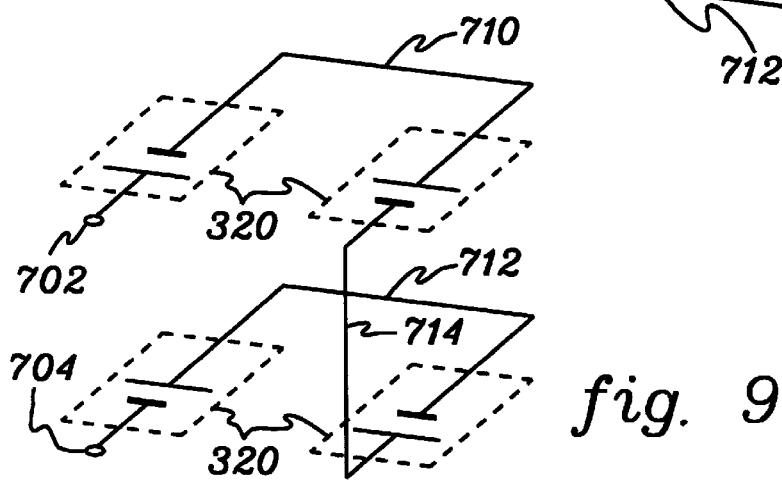
FIG. 9 is a schematic of the series electrical connection of the four sub-stacks of FIGS. 4–8 for a fuel cell assembly in accordance with the present invention.

FIGS. 7–9 depict one embodiment of the present invention for electrical connection of the parallel disposed fuel cell sub-stacks in the fuel cell assembly of FIGS. 4–6. In FIG. 7, a simplified end plate 302 is shown along with embedded collector plates 310, which conduct current at one end of the respective sub-stacks. Electrical connections 702 & 704 are made to the fuel cell assembly, e.g., for driving a load (not shown). FIG. 8 depicts the opposite end plate 304 wherein collector plates 310 are again imbedded for conducting current at the opposite ends of the sub-stacks. In the example of FIGS. 7, 8 & 9, the parallel fuel cell sub-stacks of the fuel cell assembly are electrically series connected via bus bars 710, 712 & 714. By way of example, bus bars 710 & 712 are shown imbedded within end plate 304, while bar 714 is imbedded within end plate 302. FIG. 9 presents a schematic of this electrical interconnection of the fuel cell sub-stacks 320 of the assembly.

Also shown in FIGS. 7 & 8 are manifold openings 800 for aligning to fluid manifolds provided intermediate the fuel cell sub-stacks in accordance with the present invention. Further, by way of example, opening 812 may be provided to accommodate a structural member, again for better distribution of compressive force within the fuel cell assembly. Those skilled in the art will recognize, however, that various numbers and positions of manifold and bolt openings intermediate the fuel cell sub-stacks can be envisioned pursuant to this invention.

Figure 10:
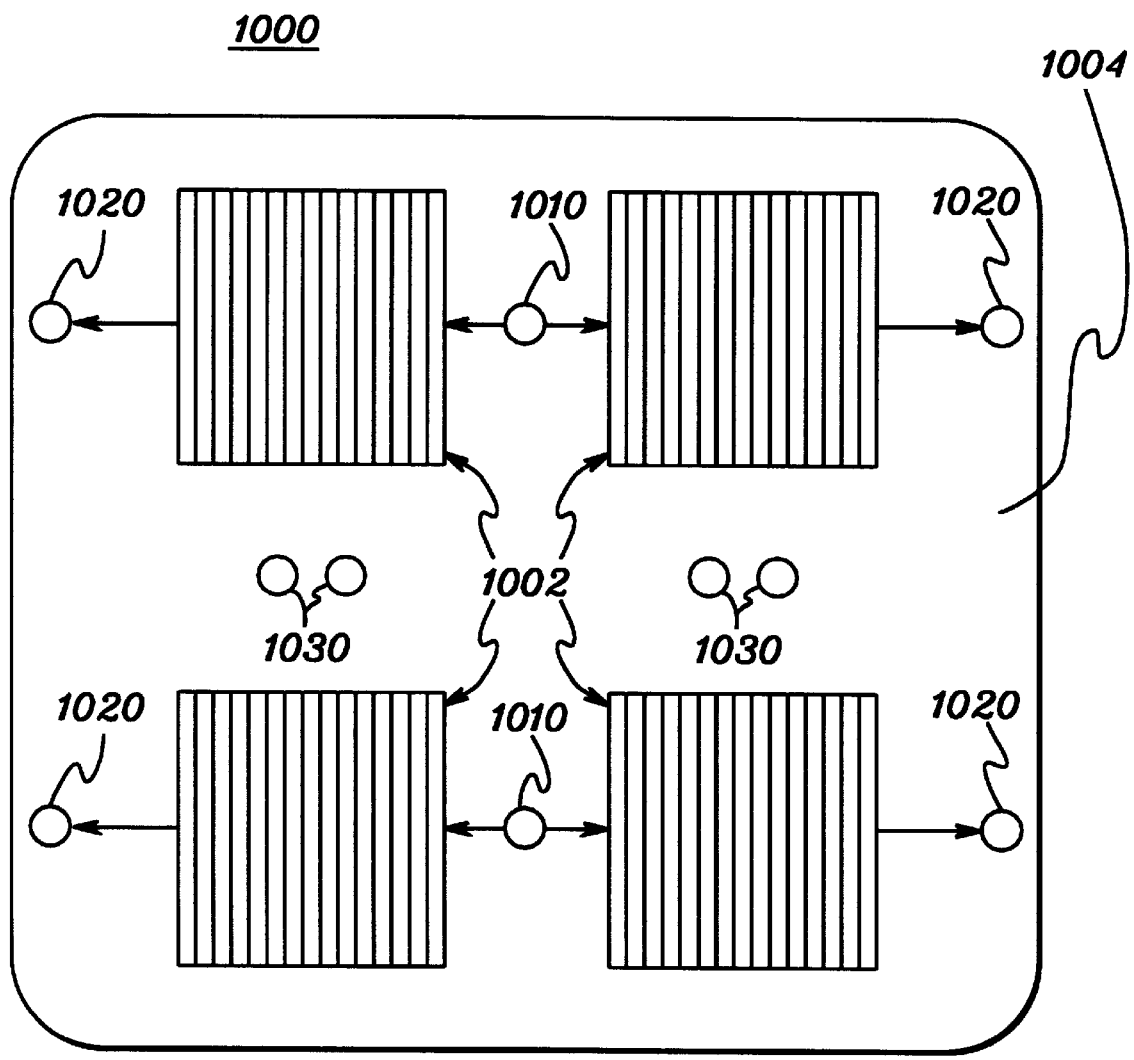
FIG. 10 is a plan view of an alternate embodiment of a fluid flow plate assembly in accordance with the present invention (again for a four sub-stack example) in which air/oxygen is exhausted directly to the ambient environment.

FIG. 10 presents an alternate embodiment of a fluid flow plate assembly 1000 in accordance with this invention. This assembly includes multiple fluid flow sub-plates 1002 which are in alignment with and form a portion of respective fuel cell sub-stacks of the fuel cell assembly as described above. Each fluid flow sub-plate 1002 is electrically isolated by non-conductive region 1004. In this embodiment, a PEM fuel cell assembly is assumed and openings 1010 are provided in plate assembly 1000. These openings have perimeters which form sections of a hydrogen inlet manifold that provides hydrogen fluid to the fluid flow sub-plates 1002. Outlet manifolds would align to openings 1020. Air/oxygen manifolds align to openings 1030, which are also provided intermediate the fluid flow sub-plates 1002.

In this embodiment, the fuel cell assembly is configured as an atmospheric pressure stack wherein air is supplied through the manifolds to the cathode flow fields of each of the four parallel sub-stacks, and then exhausted directly into the atmosphere. Thus, each fuel flow sub-plate is arranged so that an edge of the cathode flow field extends near an outer edge of the fluid flow plate assembly to facilitate exhausting of the air to the atmosphere. Again, the particular location, number and configuration of the air/oxygen manifolds, as well as the inlet/return manifolds for the hydrogen fuel can be varied as desired.

Figure 11:
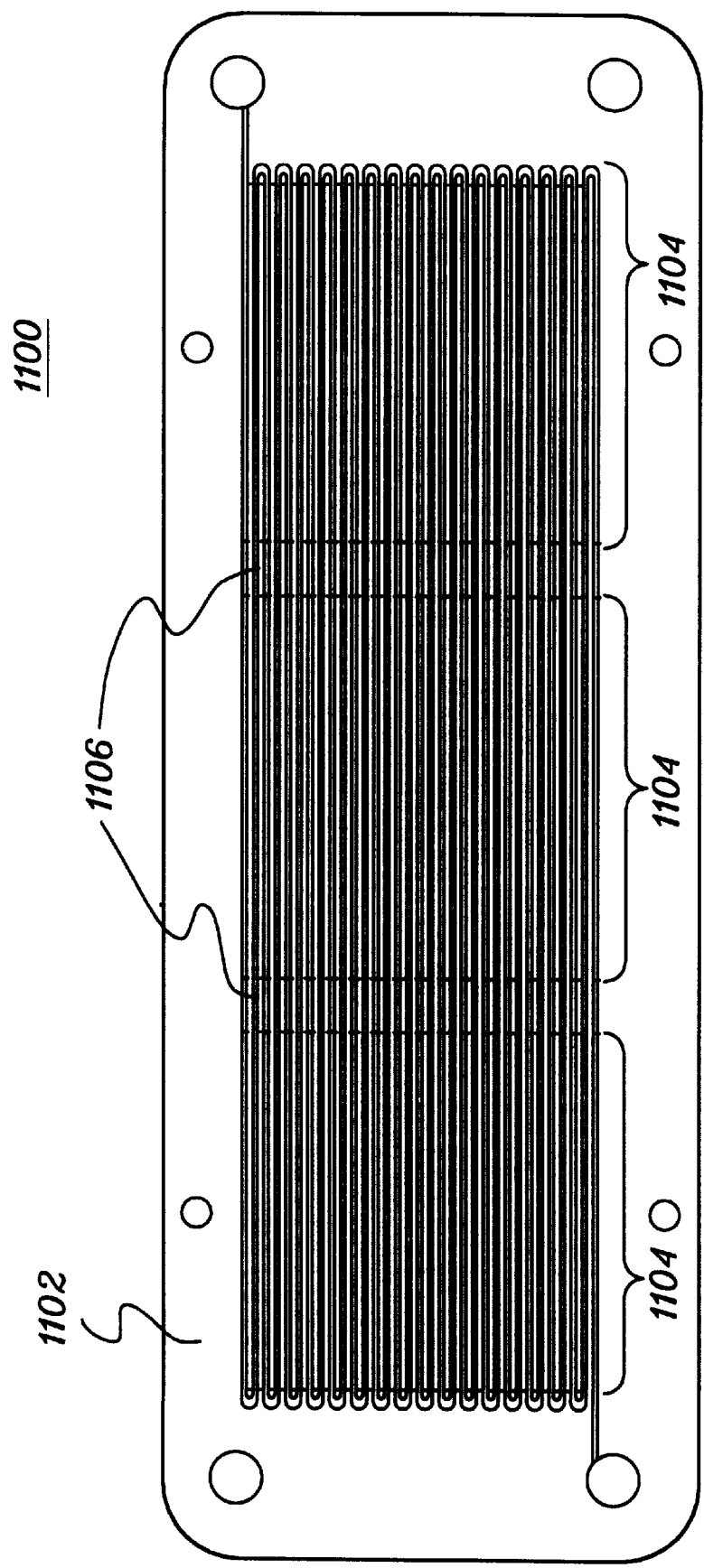
FIG. 11 is a plan view of still another embodiment of a fluid flow plate assembly in accordance with the present invention wherein three electrically conductive, fluid flow sub-plates 1104 are defined within the plate assembly, which also employs a single, open-face fluid flow channel for providing fluid to each of the three sub-plates.

FIG. 11 presents still another embodiment of a fluid flow plate assembly 1100 in accordance with the present invention. This plate assembly 1100 includes non-conductive region 1102 and multiple conductive regions 1104. Each conductive region 1104 comprises a fluid flow sub-plate which is electrically isolated from its adjacent sub-plate(s) by non-conductive material 1102. Inlet and outlet manifolds provide fluid to a single flow channel 1106 extending through and defining the multiple fluid flow fields of the sub-plates. The single flow channel includes multiple parallel channels within each conductive sub-plate and fluid passages within region 1102 interconnecting the channels of the three fluid flow sub-plates.

Those skilled in the art will note from the above discussion that this invention provides fluid flow plate and membrane electrode assemblies for a fuel cell stack having multiple parallel fuel cell sub-stacks. The structures presented allow/comprise a smaller overall stack size without sacrificing stack voltage and reduce stack costs by minimizing the number of plates and other layers of the stack. A full size flow plate assembly in accordance with this invention is designed with a plurality of fluid flow sub-plates, each of which will comprise part of one sub-stack of the parallel sub-stacks comprising the fuel cell assembly. The conductive fluid flow sub-plates are electrically insulated laterally from each other and are electrically connected in series within the main fuel cell stack to provide a higher output voltage. A four sub-stack embodiment is described, but the concepts presented apply to any electrochemical fuel cell stack having two or more sub-stacks.

In accordance with this invention, manifolding and bolting can reside between the multiple sub-stacks. By including bolts within the middle of the fuel cell assembly, clamping pressure is better distributed and end plate deflection is minimized. Further, in another aspect, a single membrane electrode assembly (MEA) is preferably shared by PEM-type fuel cells in different sub-stacks of a PEM-type fuel cell assembly. The MEA can have different voltage potentials existing across the membrane regions aligned to different sub-stacks of the assembly. The MEA is fabricated in a configuration that optimizes material usage.

While the invention has been described in detail herein in accordance with certain preferred embodiments thereof, many modifications and changes therein may be effected by those skilled in the art. For example, non-conductive adhesive can be used between the non-conductive material of each fluid flow plate assembly and adjacent membrane electrode assembly in the fuel cell stack, while conductive adhesive can be disposed between the conductive sub-plates of the fluid flow plate assembly and corresponding regions of catalyst on the adjacent membrane electrode assembly in the fuel cell stack. Using an adhesive between various plates within the fuel cell assembly can further reduce the requirements for bolting. Accordingly, it is intended by the appended claims to cover all such modifications and changes as fall within the true spirit and scope of the invention.

We claim:

1. A fluid flow plate assembly for a fuel cell comprising:

a fluid flow plate having at least one flow channel;

wherein said fluid flow plate is divided into multiple fluid flow sub-plates, said multiple fluid flow sub-plates being laterally displaced and co-planar within said fluid flow plate, each fluid flow sub-plate being electrically insulated from other fluid flow sub-plates of said multiple fluid flow sub-plates; and said at least one flow channel communicating fluid either to or from at least one fluid flow sub-plate of said multiple fluid flow sub-plates of said fluid flow plate.

2. The fluid flow plate assembly of claim 1, wherein said fluid flow plate comprises a non-conductive material with multiple conductive members disposed therein, each fluid flow sub-plate comprising a different one of said multiple conductive members, and wherein said non-conductive material electrically isolates each conductive member from other conductive members of said multiple conductive members.

3. The fluid flow plate assembly of claim 2, wherein said at least one flow channel resides partially within said non-conductive material and partially within at least one conductive member of said multiple conductive members.

4. The fluid flow plate assembly of claim 3, wherein said at least one flow channel comprises multiple flow channels, each flow channel of said multiple flow channels residing partially within said non-conductive material and partially within a different conductive member of said multiple conductive members, wherein each flow channel communicates fluid either to or from a respective conductive member of said multiple conductive members comprising said multiple fluid flow sub-plates.

5. The fluid flow plate assembly of claim 4, wherein said fuel cell comprises a PEM fuel cell having a fluid manifold, said at least one flow channel intersecting said fluid manifold, and wherein said fluid manifold comprises one of an oxygen/air inlet, an oxygen/air outlet, a humidification water inlet, a humidification water outlet, a coolant inlet, a coolant outlet, a hydrogen inlet, and a hydrogen outlet.

6. The fluid flow plate assembly of claim 3, wherein said at least one flow channel communicates fluid either to or from at least two conductive members of said multiple conductive members of said multiple fluid flow sub-plates.

7. The fluid flow plate assembly of claim 6, wherein said fuel cell comprises a PEM fuel cell having a fluid manifold, said at least one flow channel intersecting said fluid manifold, and wherein said fluid manifold comprises one of an oxygen/air inlet, an oxygen/air outlet, a humidification water inlet, a humidification water outlet, a coolant inlet, a coolant outlet, a hydrogen inlet, and a hydrogen outlet.

8. The fluid flow plate assembly of claim 2, wherein said at least one flow channel comprises multiple parallel channel sections in at least one conductive member of said multiple conductive members, and multiple turn channel sections within said non-conductive material, said multiple turn channel sections being aligned to said multiple parallel channel sections in said conductive member so that said multiple parallel channel sections in said conductive member are in fluid communication with said multiple turn channel sections in said non-conductive material and together define a serpentine configuration of said at least one flow channel.

9. The fluid flow plate assembly of claim 8, wherein said multiple parallel channel sections in said at least one conductive member comprise open-face flow channel sections bounded by lands.

10. The fluid flow plate assembly of claim 2, wherein said fluid flow plate comprises one of a bipolar fluid flow plate or a monopolar fluid flow plate, and wherein said multiple conductive members extend between and electrically connect a first major surface of said fluid flow plate and a second major surface of said fluid flow plate.

11. The fluid flow plate assembly of claim 2, wherein said fuel cell comprises a fuel cell stack having multiple layers defining multiple parallel fuel cell sub-stacks, and wherein said fluid flow plate assembly comprises one layer of said multiple layers and at least some fluid flow sub-plates of said fluid flow plate assembly each comprise part of a respective fuel cell sub-stack of said multiple fuel cell sub-stacks of said fuel cell stack.

12. The fluid flow plate assembly of claim 11, wherein said fuel cell stack comprises a plurality of fluid manifolds, and wherein said fluid flow plate contains at least one manifold hole intermediate at least two fluid flow sub-plates, said at least one intermediate manifold hole having a perimeter which constitutes a section of at least one interior fluid manifold of said plurality of fluid manifolds of the fuel cell stack.

13. The fluid flow plate assembly of claim 12, wherein said at least one manifold hole intermediate at least two fluid flow sub-plates is formed within said non-conductive material.

14. The fluid flow plate assembly of claim 2, wherein said at least one flow channel communicates at least one of reactant fluid, product fluid or humidification fluid, and wherein said fluid flow plate further comprises at least one coolant channel intermediate said multiple fluid flow sub-plates for communicating coolant through said fluid flow plate.

15. The fluid flow plate assembly of claim 14, wherein said at least one coolant channel is disposed within said non-conductive material of said fluid flow plate.

16. The fluid flow plate assembly of claim 2, wherein said fuel cell comprises a PEM fuel cell stack having multiple layers defining multiple parallel PEM fuel cell sub-stacks, and wherein said fluid flow plate assembly comprises one layer of said multiple layers and at least some fluid flow sub-plates of said fluid flow plate assembly each comprise part of a respective PEM fuel cell sub-stack of said fuel cell stack.

17. The fluid flow plate assembly of claim 2, wherein said non-conductive material further includes a structural opening intermediate at least two of said multiple conductive members, said structural opening allowing at least one structural member of said fuel cell to extend through said fluid flow plate assembly intermediate the multiple fluid flow sub-plates.

18. The fluid flow plate assembly of claim 2, wherein said multiple fluid flow plates comprise at least two fluid flow plates aligned in a row, and wherein said at least one flow channel communicates fluid to or from each of said at least two fluid flow plates aligned in said row.

19. The fluid flow plate assembly of claim 1, wherein the fuel cell comprises an atmospheric pressure fuel cell stack, and wherein each fluid flow sub-plate of said multiple fluid flow sub-plates exhausts one of oxygen or air directly into the atmosphere.

20. A fuel cell assembly comprising:
multiple fuel cell sub-stacks disposed in parallel and having multiple layers, at least some layers of said multiple layers comprising shared layers between said fuel cell sub-stacks;
wherein one shared layer of said at least some shared layers comprises a fluid flow plate assembly, said fluid flow plate assembly including:
(i) a fluid flow plate having at least one flow channel;
(ii) wherein said fluid flow plate is divided into multiple fluid flow sub-plates, said multiple fluid flow sub-plates being laterally displaced and co-planar within said fluid flow plate, each fluid flow sub-plate being electrically insulated from other fluid flow sub-plates of said multiple fluid flow sub-plates, and each fluid flow sub-plate comprising part of a respective one of said multiple parallel fuel cell sub-stacks of said fuel cell assembly; and
(iii) said at least one flow channel communicating fluid either to or from at least one fluid flow sub-plate of said multiple fluid flow sub-plates of said fluid flow plate.

21. The fuel cell assembly of claim 20, wherein each fuel cell sub-stack of said multiple fuel cell sub-stacks disposed in parallel comprises a PEM fuel cell.

22. The fuel cell assembly of claim 20, further comprising a first end plate and a second end plate, said multiple parallel fuel cell sub-stacks being disposed between said first end plate and said second end plate, and wherein said first end plate and said second end plate include electrical conductors for series electrically connecting said multiple parallel fuel cell sub-stacks.

23. The fuel cell assembly of claim 22, wherein said fluid flow plate comprises a non-conductive material with multiple conductive members disposed therein, each fluid flow sub-plate comprising a different one of said conductive members, and wherein said non-conductive material electrically isolates each conductive member from other conductive members of the fluid flow plate.

24. The fluid flow plate assembly of claim 23, wherein said at least one flow channel resides partially within said non-conductive material and partially within at least one conductive member of said multiple conductive members.

25. The fuel cell assembly of claim 24, wherein said at least one flow channel comprises multiple parallel channel sections in at least one conductive member of said multiple conductive members, and multiple turn channel sections within said non-conductive material, said multiple turn channel sections being aligned to said multiple parallel channel sections in the at least one conductive member so that said multiple parallel channel sections in said conductive member are in fluid communication with said multiple turn channel sections in said conductive material and together define a serpentine configuration of said at least one flow channel.

26. The fuel cell assembly of claim 25, wherein said multiple parallel channel sections in said at least one conductive member comprise open-face flow channel sections bounded by lands.

27. The fuel cell assembly of claim 26, wherein said fluid flow plate comprises one of a bipolar fluid flow plate or a monopolar fluid flow plate, and wherein said multiple conductive members extend between and electrically connect a first major surface of said fluid flow plate and a second major surface of said fluid flow plate.

28. The fuel cell assembly of claim 23, wherein said fuel cell assembly comprises a plurality of fluid manifolds, and wherein at least one fluid manifold of said plurality of fluid manifolds extends within said fuel cell assembly in parallel with said fluid cell sub-stacks and is disposed intermediate at least two fuel cell sub-stacks of said fuel cell assembly.

29. A membrane electrode assembly (MEA) for a PEM fuel cell stack, said membrane electrode assembly comprising:
a solid electrolyte layer having two main surfaces;
multiple regions of catalyst applied to each main surface of said solid electrolyte layer, said multiple regions of catalyst on each main surface being laterally displaced on said main surface;
wherein said PEM fuel cell stack comprises multiple fuel cell sub-stacks disposed in parallel and wherein said MEA is to be shared by said multiple parallel fuel cell sub-stacks, and when shared, at least some catalyst regions on said main surfaces of said solid electrolyte layer align to different fuel cell sub-stacks of said multiple parallel fuel cell sub-stacks; and
wherein said PEM fuel cell stack includes at least one fluid manifold, and wherein said solid electrolyte layer comprises at least one manifold hole whose perimeter constitutes a section of said at least one fluid manifold of said PEM fuel cell stack.

30. The MEA of claim 29, wherein different voltage potentials simultaneously exist across different regions of said MEA when said MEA is shared by said multiple fuel cell sub-stacks disposed in parallel.

31. The MEA of claim 30, wherein protons travel in different directions across said MEA in said different regions of voltage potential across said MEA, said regions of different voltage potential each comprising part of a different fuel cell sub-stack of said multiple parallel fuel cell sub-stacks in said PEM fuel cell stack.

32. The MEA of claim 30, wherein when shared by said multiple fuel cell sub-stacks, said MEA is sandwiched between a plurality of gas diffusion layers (GDLs), each fuel cell sub-stack of said multiple parallel fuel cell sub-stacks having a first GDL and a second GDL with said MEA sandwiched therebetween, and wherein said first and second GDLs of each sub-stack have a same size and shape to a size and shape of corresponding catalyst regions on each main surface of said solid electrolyte layer of said MEA.

33. The MEA of claim 29, wherein said at least one fluid manifold of said PEM fuel cell stack comprises multiple fluid manifolds, and wherein said solid electrolyte layer comprises multiple manifold holes whose perimeters constitute sections of said multiple fluid manifolds of said PEM fuel cell stack.

34. A fuel cell assembly comprising:
   multiple fuel cell sub-stacks disposed in parallel, each fuel cell sub-stack comprising a PEM fuel cell;
   wherein said multiple parallel fuel cell sub-stacks comprise multiple layers, at least some layers of said multiple layers comprising shared layers between said fuel cell sub-stacks; and
   a membrane electrode assembly (MEA) comprising one shared layer of said at least some shared layers, said MEA including:
      (i) a solid electrolyte layer having two main surfaces;
      (ii) multiple regions of catalyst applied to each main surface of said solid electrolyte layer, said multiple regions of catalyst on each main surface being laterally displaced on said main surface; and
      (iii) wherein at least some catalyst regions on said main surfaces of said solid electrolyte layer align with and comprise part of different fuel cell sub-stacks of said multiple parallel fuel cell sub-stacks so that said MEA is shared between at least two fuel cell sub-stacks of said fuel cell assembly.

35. The fuel cell assembly of claim 34, wherein different voltage potentials simultaneously exist across different regions of said MEA when said MEA is shared by said at least two fuel cell sub-stacks.

36. The fuel cell assembly of claim 35, wherein protons travel in different directions across said MEA in said different regions of voltage potential across said MEA, said regions of different voltage potential each comprising part of a different fuel cell sub-stack of said multiple parallel fuel cell sub-stacks.

37. The fuel cell assembly of claim 34, further comprising a first end plate and a second end plate, said multiple parallel fuel cell sub-stacks being disposed between said first end plate and said second end plate, and wherein said first end plate and said second end plate include electrical conductors for series electrically connecting said multiple parallel fuel cell sub-stacks.

38. A PEM fuel cell stack comprising:
   multiple layers disposed between a first end plate and a second end plate, said multiple layers defining multiple laterally displaced fuel cell sub-stacks;
   at least some layers of said multiple layers being shared by at least two sub-stacks of said multiple fuel cell sub-stacks; and
   wherein said at least some layers comprising said shared layers each contain a manifold hole whose perimeter constitutes a section of a fluid manifold of the PEM fuel cell stack, said manifold hole being disposed between said at least two sub-stacks sharing said layer and said fluid manifold being disposed in the interior of said PEM fuel cell stack intermediate said multiple laterally displaced fuel cell sub-stacks.

39. The PEM fuel cell stack of claim 38, further comprising at least one structural member extending within said fuel cell stack intermediate at least two sub-stacks of said multiple fuel cell sub-stacks, said structural member facilitating application of compressive force to said PEM fuel cell stack.

40. The PEM fuel cell stack of claim 38, wherein said first end plate and said second end plate include electrical conductors for electrically connecting said multiple fuel cell sub-stacks.

41. The PEM fuel cell stack of claim 38, wherein at least some layers of said multiple layers are dedicated to only one fuel cell sub-stack of said multiple fuel cell sub-stacks.

42. The PEM fuel cell stack of claim 41, wherein said at least some shared layers comprise a fluid flow plate assembly and a membrane electrode assembly, and wherein said at least some dedicated layers comprise gas diffusion layers (GDLs) at least one GDL for one fuel cell sub-stack being sandwiched between said shared fluid flow plate assembly and said shared membrane electrode assembly.

43. The PEM fuel cell stack of claim 42, wherein said fluid flow plate assembly comprises a non-conductive material with multiple conductive sub-plates disposed therein, wherein said non-conductive material electrically isolates said conductive sub-plates within said fluid flow plate assembly, said multiple conductive sub-plates being laterally displaced and co-planar within said fluid flow plate.

44. The PEM fuel cell stack of claim 43, further comprising non-conductive adhesive disposed between said non-conductive material of said fluid flow plate assembly and said membrane electrode assembly.

45. The PEM fuel cell stack of claim 43, wherein said membrane electrode assembly includes multiple regions of catalyst applied to each main surface of a solid electrolyte layer, said multiple regions of catalyst on each main surface being laterally displaced on said main surface, and wherein said fuel cell stack further comprises conductive adhesive disposed between said conductive sub-plates of said fluid flow plate assembly and at least some regions of catalyst of said membrane electrode assembly.

46. A membrane for a PEM fuel cell stack, said membrane comprising:
   a solid electrolyte layer having two main surfaces;
   wherein said PEM fuel cell stack comprises multiple fuel cell sub-stacks disposed in parallel and wherein said membrane is to be shared by said multiple parallel fuel cell sub-stacks; and
   wherein said PEM fuel cell stack includes at least one fluid manifold, and wherein said solid electrolyte layer comprises at least one manifold hole whose perimeter constitutes a section of said at least one fluid manifold of said PEM fuel cell stack.

47. The membrane of claim 46, wherein said at least one fluid manifold of said PEM fuel cell stack comprises multiple fluid manifolds, and wherein said solid electrolyte layer comprises multiple manifold holes whose perimeters constitute sections of said multiple fluid manifolds of said PEM fuel cell stack.

* * * * *

UNITED STATES PATENT AND TRADEMARK OFFICE
CERTIFICATE OF CORRECTION

PATENT NO. : 5,945,232
DATED : August 31, 1999
INVENTOR(S): Ernst et al.

It is certified that error appears in the above-identified patent and that said Letters Patent is hereby corrected as shown below:

IN THE TITLE:

Delete "SHARED FLUID PLATE" and replace with --SHARED FLUID FLOW PLATE--.

Col. 2, line 17, delete "$H_22 \rightarrow H^+$" and replace with --$H_2 \rightarrow 2H^+$--.

Signed and Sealed this

Fifteenth Day of February, 2000

Attest:

Attesting Officer

Q. TODD DICKINSON

*Commissioner of Patents and Trademarks*